United States Patent
Zhang et al.

(10) Patent No.: US 12,541,885 B2
(45) Date of Patent: Feb. 3, 2026

(54) ON CODING OF BOUNDARY UV2XYZ INDEX FOR MESH COMPRESSION

(71) Applicant: TENCENT AMERICA LLC, Palo Alto, CA (US)

(72) Inventors: Xiang Zhang, Sunnyvale, CA (US); Xiaozhong Xu, State College, PA (US); Chao Huang, Palo Alto, CA (US); Jun Tian, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 372 days.

(21) Appl. No.: 18/191,457

(22) Filed: Mar. 28, 2023

(65) Prior Publication Data
US 2023/0334713 A1 Oct. 19, 2023

Related U.S. Application Data

(60) Provisional application No. 63/331,699, filed on Apr. 15, 2022.

(51) Int. Cl.
*G06T 9/00* (2006.01)
*H04N 19/91* (2014.01)

(52) U.S. Cl.
CPC ............. *G06T 9/001* (2013.01); *H04N 19/91* (2014.11)

(58) Field of Classification Search
CPC ........ G06T 9/001; H04N 19/91; H04N 19/46; H04N 19/597
See application file for complete search history.

(56) References Cited

U.S. PATENT DOCUMENTS

| | | |
|---|---|---|
| 6,262,737 B1 | 7/2001 | Li et al. |
| 2005/0017968 A1 | 1/2005 | Wurmlin et al. |
| 2008/0181486 A1* | 7/2008 | Spooner .................... G06T 7/55 |
| | | 382/154 |

(Continued)

FOREIGN PATENT DOCUMENTS

WO WO-2021136878 A1 * 7/2021 ............. G06T 9/001

OTHER PUBLICATIONS

Peng, Jingliang, Chang-Su Kim, and C-C. Jay Kuo. "Technologies for 3D mesh compression: A survey." Journal of visual communication and image representation 16.6 (2005): 688-733. (Year: 2005).*

(Continued)

*Primary Examiner* — Oneal R Mistry
*Assistant Examiner* — Jongbong Nah
(74) *Attorney, Agent, or Firm* — Sughrue Mion, PLLC

(57) ABSTRACT

A method performed in a decoder includes receiving a coded video bitstream that includes (i) one or more two dimensional (2D) meshes corresponding to a three dimensional (3D) mesh and (ii) a 2D to 3D index array that maps each vertex in the one or more 2D meshes to a respective vertex in the 3D mesh. The method further includes reconstructing the 3D mesh using the 2D to 3D index array to map each vertex in the one or more 2D meshes to the respective vertex in the 3D mesh. The 2D to 3D index array encoded in a tuple format in which each tuple in the 2D to 3D index array includes a first parameter that specifies a starting index of a run, a second parameter that specifies a length of the run, and a third parameter that specifies a direction of the run.

20 Claims, 10 Drawing Sheets

(56) References Cited

U.S. PATENT DOCUMENTS

2016/0373756 A1 12/2016 Yu et al.
2021/0233282 A1* 7/2021 Kim .................. G06T 15/205

OTHER PUBLICATIONS

Taubin, Gabriel, et al. "Geometry coding and VRML." Proceedings of the IEEE 86.6 (2002): 1228-1243. (Year: 2002).*
International Search Report dated Jul. 25, 2023, issued in International Application No. PCT/US2023/016830.
Written Opinion dated Jul. 25, 2023, issued in International Application No. PCT/US2023/016830.
Jingliang Peng et al., "Technologies for 3D mesh compression: A survey", J. Vis. Commun. Image R., 2005, vol. 16, pp. 688-733 (46 pages).
Gabriel Taubin et al., "Geometry Coding and VRML", Proceedings of the IEEE, Jun. 1998, vol. 86, No. 6, pp. 1228-1243 (16 pages).
Chao Huang et al., "Boundary-Preserved Geometry Video for Dynamic Mesh Coding", IEEE, 2022, pp. 133-137 (8 pages).
Mamou Khaled et al: "Multi-Chart Geometry Video: A Compact Representation for 3D Animations", 3D Data Processing, Visualization, and Transmission, Third International Symposium on, Jun. 14, 2006 (Jun. 14, 2006), pp. 711-718, XP093254801, Los Alamitos, Calif., USA, DOI: 10.1109/3DPVT.2006.97 ISBN: 978-0-7695-2825-0.
Wood Zoe J et al: "Multi-chart geometry images", Eurographics Symposium on Geometry Processing, Sep. 8, 2009 (Sep. 8, 2009), pp. 1-10, XP055716208.
Xiang Zhang (Tencent) et al: "[V-CG] Tencent's Dynamic Mesh Coding CfP Response", 138. Mpeg Meeting; Apr. 25, 2022-Apr. 29, 2022; Online; (Motion Picture Expert Group or ISO/IEC JTC1/SC29/WG11), No. m59295, Apr. 16, 2022 (Apr. 16, 2022), XP030301455.
Xiang Zhang (Tencent) et al: "[V-CG] Tencent's Dynamic Mesh Coding CfP Response", 138. MPEG Meeting; Apr. 25, 2022-Apr. 29, 2022; Online; (Motion Picture Expert Group or ISO/IEC JTC1/SC29/WG11), No. m59295, Apr. 25, 2022 (Apr. 25, 2022), XP030301456.
Extended European Search Report dated Jul. 1, 2025, issued in EP Application No. 23788749.2.

* cited by examiner

ON CODING OF BOUNDARY UV2XYZ INDEX FOR MESH COMPRESSION

CROSS-REFERENCE TO RELATED APPLICATION

This application claims priority from U.S. Provisional Application No. 63/331,699 filed on Apr. 15, 2022, the disclosure of which is incorporated herein by reference in its entirety.

FIELD

This disclosure is directed to a set of advanced video coding technologies. More specifically, the present disclosure is directed to video based mesh compression including coding methods of UV2XYZ index of boundary vertices for efficient mesh compression.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may be composed of several polygons that describe the surface of a volumetric object. A dynamic mesh sequence may require a large amount of data since the mesh sequence may have a significant amount of information changing over time. Therefore, efficient compression technologies are required to store and transmit such contents.

Mesh compression standards IC, MESHGRID, FAMC were previously developed to address dynamic meshes with constant connectivity and time varying geometry and vertex attributes. However, these standards do not take into account time varying attribute maps and connectivity information.

Furthermore, it is also challenging for volumetric acquisition techniques to generate a constant connectivity dynamic mesh, especially under real time constraints. This type of dynamic mesh content is not supported by the existing standards.

SUMMARY

According to one or more embodiments, a method performed by at least one processor in a decoder includes receiving a coded video bitstream that includes (i) one or more two dimensional (2D) meshes corresponding to a three dimensional (3D) mesh and (ii) a 2D to 3D index array that maps each vertex in the one or more 2D meshes to a respective vertex in the 3D mesh. The method further includes reconstructing the 3D mesh using the 2D to 3D index array to map each vertex in the one or more 2D meshes to the respective vertex in the 3D mesh. The 2D to 3D index array is encoded in a tuple format in which each tuple in the 2D to 3D index array includes a first parameter that specifies a starting index of a run of consecutive integers, a second parameter that specifies a length of the run, and a third parameter that specifies a direction of the run.

According to one or more embodiments, a decoder comprises at least one memory configured to store program code and at least one processor configured to read the program code and operate as instructed by the program code. The program code includes receiving code configured to cause the at least one processor to receive a coded video bitstream that includes (i) one or more two dimensional (2D) meshes corresponding to a three dimensional (3D) mesh and (ii) a 2D to 3D index array that maps each vertex in the one or more 2D meshes to a respective vertex in the 3D mesh. The program code includes reconstructing code configured to cause the at least one processor to reconstruct the 3D mesh using the 2D to 3D index array to map each vertex in the one or more 2D meshes to the respective vertex in the 3D mesh. The 2D to 3D index array is encoded in a tuple format in which each tuple in the 2D to 3D index array includes a first parameter that specifies a starting index of a run, a second parameter that specifies a length of the run of consecutive integers, and a third parameter that specifies a direction of the run.

According to one or more embodiments, a non-transitory computer readable medium having instructions stored therein, which when executed by a processor in a decoder cause the processor to execute receiving a coded video bitstream that includes (i) one or more two dimensional (2D) meshes corresponding to a three dimensional (3D) mesh and (ii) a 2D to 3D index array that maps each vertex in the one or more 2D meshes to a respective vertex in the 3D mesh; and reconstructing the 3D mesh using the 2D to 3D index array to map each vertex in the one or more 2D meshes to the respective vertex in the 3D mesh. The 2D to 3D index array is encoded in a tuple format in which each tuple in the 2D to 3D index array includes a first parameter that specifies a starting index of a run of consecutive integers, a second parameter that specifies a length of the run, and a third parameter that specifies a direction of the run.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
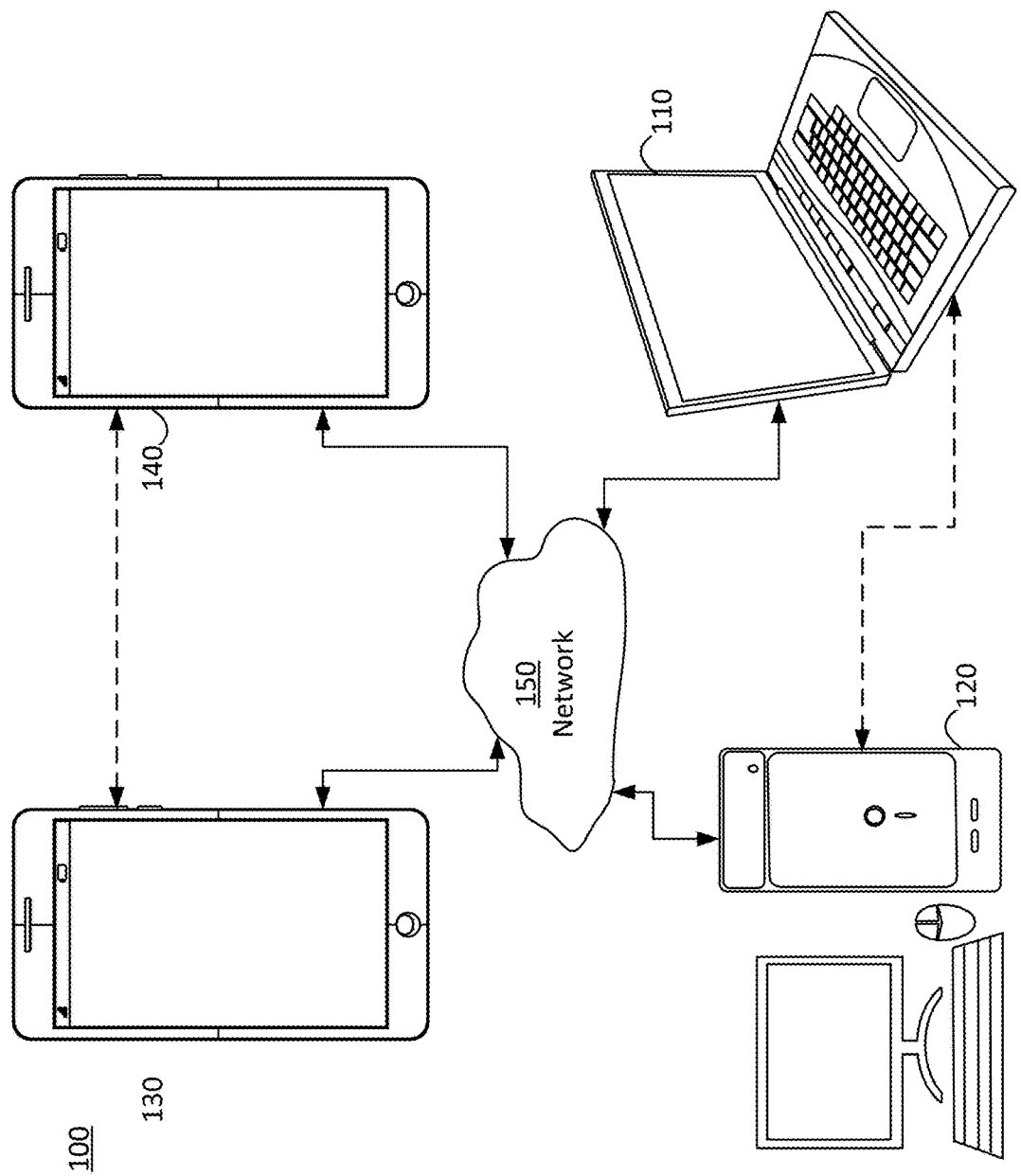
FIG. 1 is a schematic illustration of a block diagram of a communication system, in accordance with embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Embodiments of the present disclosure are directed to compressing a mesh. A mesh may be composed of several polygons that describe the surface of a volumetric object. Its vertices in 3D space and the information of how the vertices are connected may define each polygon, referred to as connectivity information. Optionally, vertex attributes, such as colors, normals, etc., may be associated with the mesh vertices. Attributes may also be associated with the surface of the mesh by exploiting mapping information that parameterizes the mesh with 2D attribute maps. Such mapping may be defined using a set of parametric coordinates, referred to as UV coordinates or texture coordinates, and associated with the mesh vertices. 2D attribute maps may be used to store high resolution attribute information such as texture, normals, displacements etc. The high resolution attribute information may be used for various purposes such as texture mapping and shading.

As stated above, a 3D mesh or dynamic meshes may require a large amount of data since it may consist of a significant amount of information changing over time. Existing standards do not take into account time varying attribute maps and connectivity information. Existing standards also do not support volumetric acquisition techniques that generate a constant connectivity dynamic mesh, especially under real-time conditions.

Therefore, a new mesh compression standard to directly handle dynamic meshes with time varying connectivity information and optionally time varying attribute maps is needed. Embodiments of the present disclosure enable efficient compression technologies to store and transmit such dynamic meshes. Embodiments of the present disclosure enable lossy and/or lossless compression for various applications, such as real-time communications, storage, free viewpoint video, AR and VR.

According to one or more embodiments of the present disclosure, methods, systems, and non-transitory storage mediums for dynamic mesh compression are provided. Embodiments of the present disclosure may also be applied to static meshes, where only one frame of the mesh or the mesh content does not change over time.

Figure 2:
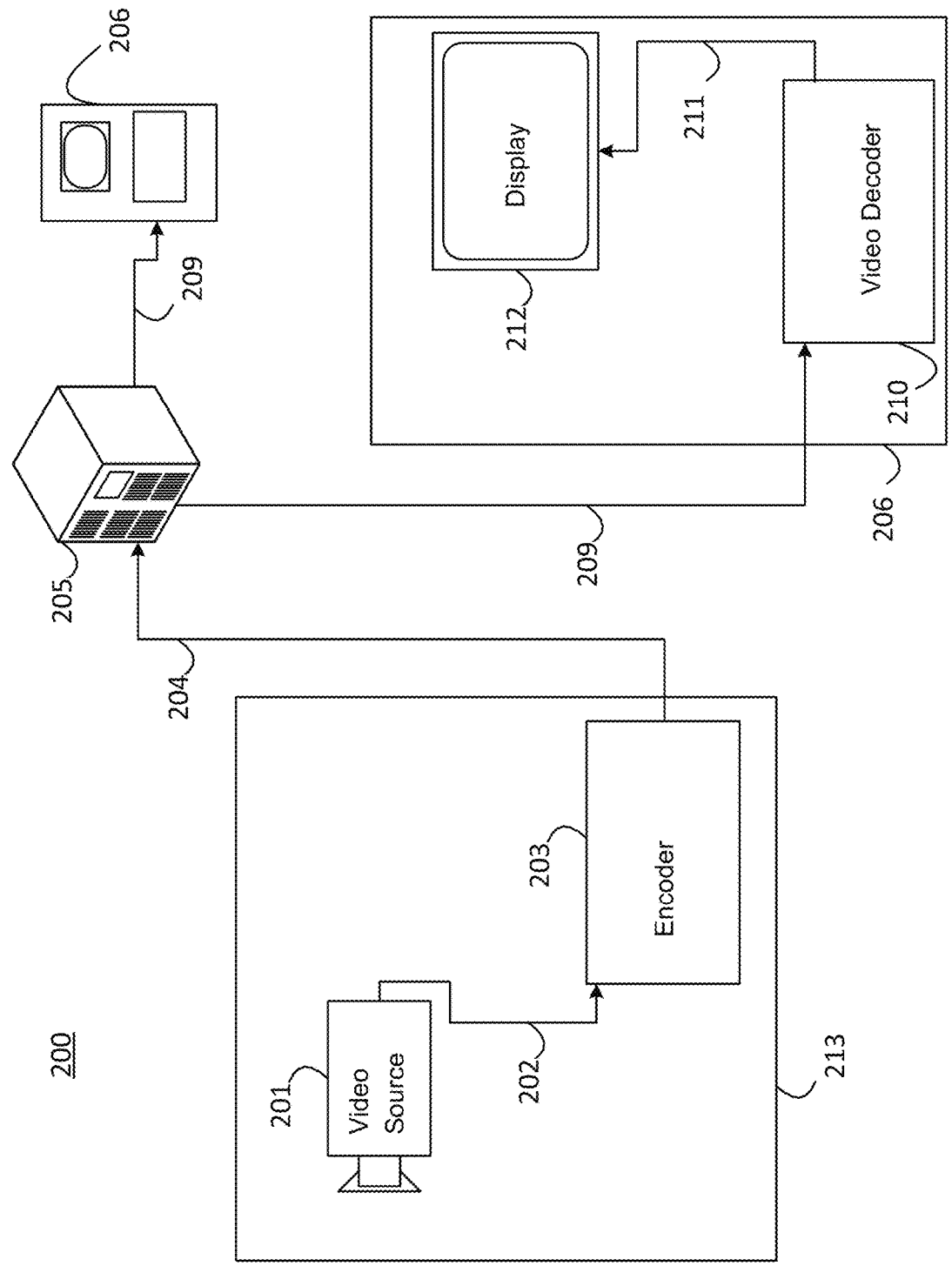
FIG. 2 is a schematic illustration of a block diagram of a streaming system, in accordance with embodiments of the present disclosure.

With reference to FIGS. 1-2, one or more embodiments of the present disclosure for implementing encoding and decoding structures of the present disclosure are described. FIG. 1 illustrates a simplified block diagram of a communication system 100
according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. A 3D mesh may be composed of several polygons that describe the surface of a volumetric object. For example, the 3D mesh may contain a plurality of vertices in a 3D space where each vertex is associated with a 3D coordinate (e.g., x, y, z). The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 may, for example, decode the encoded video bitstream 209, which is an incoming copy of the encoded video bitstream 204, and create an outgoing video sample stream 211 that may be rendered on the display 212 or another rendering device (not depicted).

In some streaming systems, the video bitstreams 204, 209 may be encoded according to certain video coding/compression standards.

Figure 3:
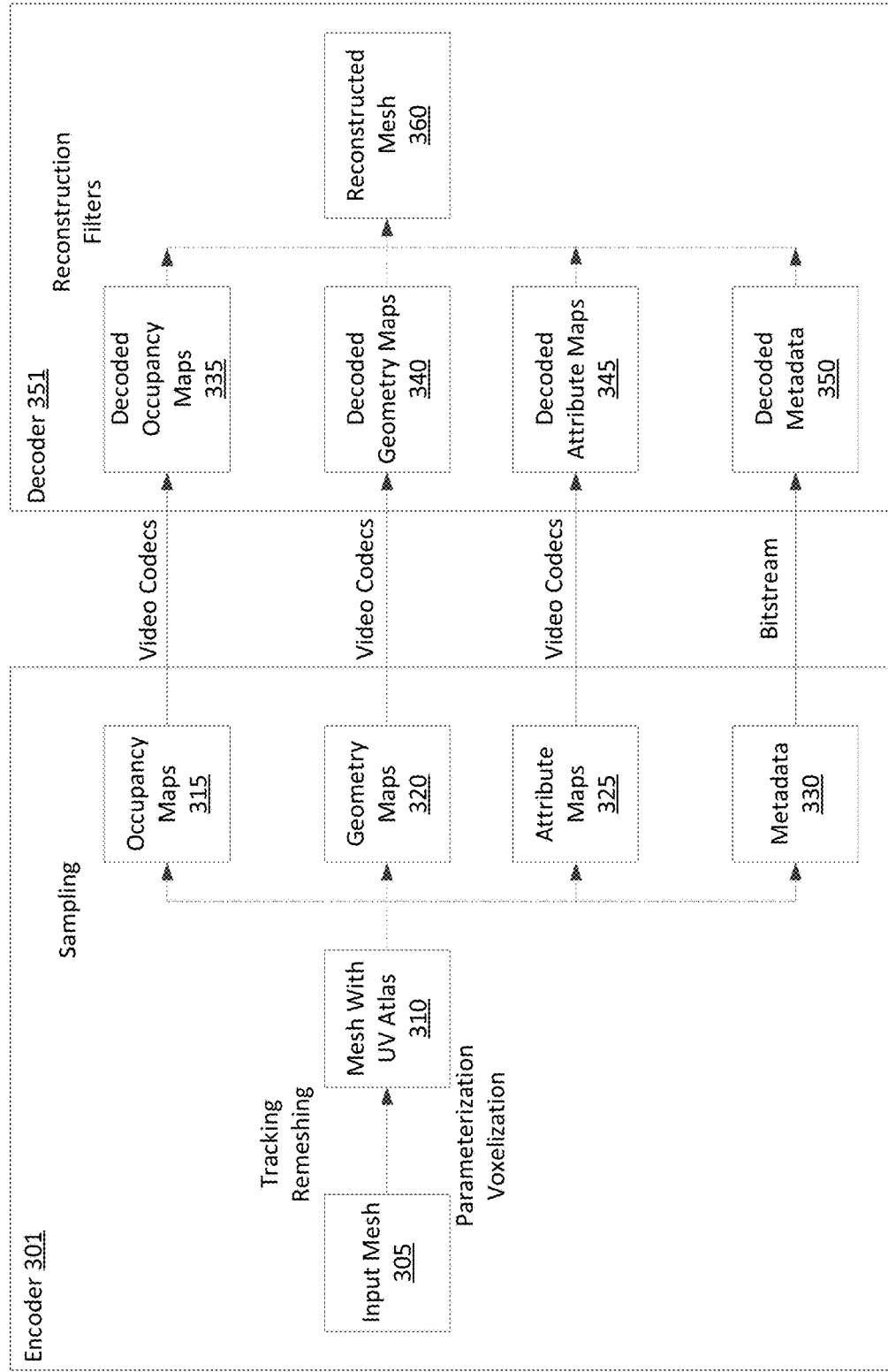
FIG. 3 is a schematic illustration of a block diagram of a video encoder and decoder, in accordance with embodiments of the present disclosure.

FIG. 3 is an exemplary diagram of framework 300 for dynamic mesh compression and mesh reconstruction using encoders and decoders.

As seen in FIG. 3, framework 300 may include an encoder 301 and a decoder 351. The encoder 301 may include one or more input mesh 305, one or more mesh with UV atlas 310, occupancy maps 315, geometry maps 320, attribute maps 325, and metadata 330. The decoder 351 may include decoded occupancy maps 335, decoded geometry maps 340, decoded attribute maps 345, decoded metadata 350, and reconstructed mesh 360.

According to one or more embodiments of the present disclosure, the input mesh 305 may include one or more frames, and each of the one or more frames may be preprocessed by a series of operations and used to generate the mesh with UV atlas 310. As an example, the preprocessing operations may include and may not be limited to tracking, parameterization, remeshing, voxelization, etc. In some embodiments, the preprocessing operations may be performed only on the encoder side and not the decoder side.

The mesh with UV atlas 310 may be a 2D mesh. The 2D mesh may be a chart of vertices each associated with a coordinate in a 2D space (e.g., 2D coordinate). Each vertex in the 2D mesh may be associated with a corresponding vertex in a 3D mesh where the vertex in the 3D mesh is associated with a coordinate in a 3D space. A compressed 2D mesh may be a version of the 2D mesh with a reduction in information compared to the uncompressed 2D mesh. For example, the 2D meshed may be sampled at a sampling rate where the compressed 2D mesh includes the sampled points. The 2D mesh with UV atlas may be a mesh in which each vertex of the mesh may be associated with UV coordinates on a 2D atlas. For example, the 2D atlas may be a two dimensional plane where each 3D coordinate in a 3D space may be assigned to a 2D coordinate in the 2D plane. The connected 2D coordinates may be referred to as a 2D chart or patch. The mesh with the UV atlas 310 may be processed and converted into a plurality of maps based on sampling. As an example, the UV atlas 310 may be processed and converted into occupancy maps, geometry maps, and attribute maps based on sampling the 2D mesh with the UV atlas. The generated occupancy maps 335, geometry maps 340, and attribute maps 345 may be encoded using appropriate codecs (e.g., HVEC, VVC, AV1, AVS3 etc.) and transmitted to a decoder. In some embodiments, metadata (e.g., connectivity information etc.) may also be transmitted to the decoder.

In some embodiments, on the decoder side, the meshes may be reconstructed from the decoded 2D maps. Post-processing and filtering may also be applied on the reconstructed meshes. In some examples, metadata might be signaled to the decoder side for the purpose of 3D mesh reconstruction. The occupancy map may be inferred from the decoder side if the boundary vertices of each patch are signaled.

According to an aspect, the decoder 351 may receive the encoded occupancy maps, geometry maps, and attribute maps from an encoder. The decoder 315 may use appropriate techniques and methods, in addition to embodiments described herein, to decode the occupancy maps, geometry maps, and attribute maps. In some embodiments, decoder 351 may generate decoded occupancy maps 335, decoded geometry maps 340, decoded attribute maps 345, and decoded metadata 350. The input mesh 305 may be reconstructed into reconstructed mesh 360 based on the decoded occupancy maps 335, decoded geometry maps 340, decoded attribute maps 345, and decoded metadata 350 using one or more reconstruction filters and techniques. In some embodiments, the metadata 330 may be directly transmitted to decoder 351 and the decoder 351 may use the metadata to generate the reconstructed mesh 360 based on the decoded occupancy maps 335, decoded geometry maps 340, and decoded attribute maps 345. Post-filtering techniques, including but not limited to remeshing, parameterization, tracking, voxelization, etc., may also be applied on the reconstructed mesh 360.

Figure 4:
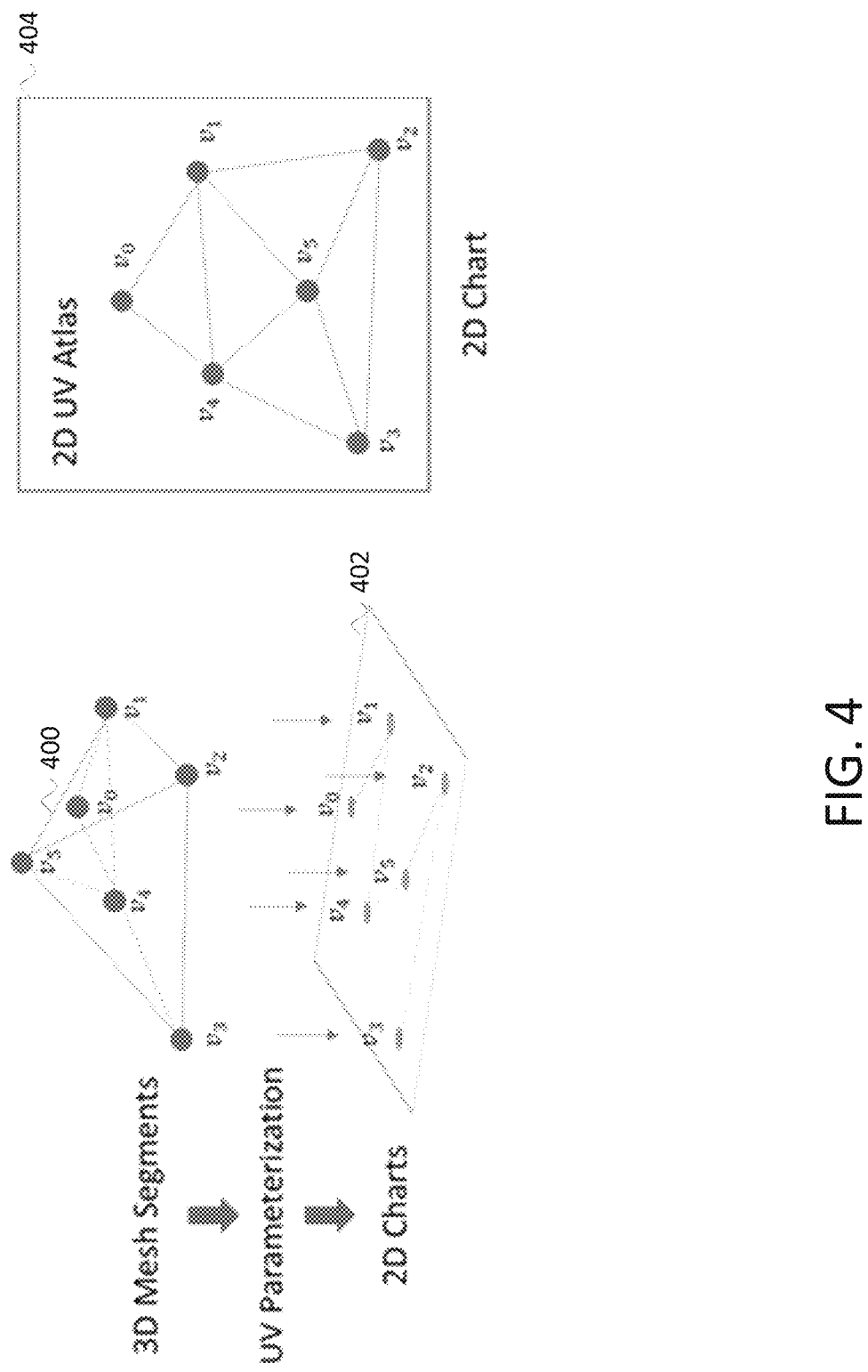
FIG. 4 illustrates an example of UV parameterization mapping from 3D mesh segments onto 2D charts, in accordance with embodiments of the present disclosure.

According to some embodiments, a 3D mesh may be partitioned into several segments (or patches/charts). Each segment may be composed of a set of connected vertices associated with their geometry, attribute, and connectivity information. As illustrated in FIG. 4, a UV parameterization process maps a mesh segment 400 onto a 2D chart in the 2D UV atlas (402, 404). Each vertex in the mesh segment may be assigned with a 2D UV coordinates in the 2D UV atlas. The vertices in a 2D chart (e.g., 2D mesh) may form a connected component as their 3D counterpart. The geometry, attribute, and connectivity information of each vertex may be inherited from their 3D counterpart as well.

Figure 5:
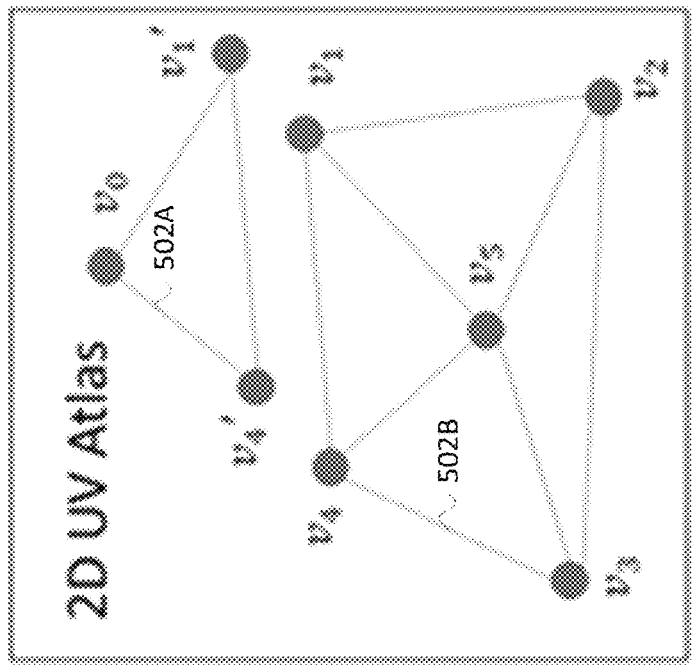
FIG. 5 illustrates an example of different UV parameterization where a 3D mesh segment is mapped to multiple separate charts
Figure 5:
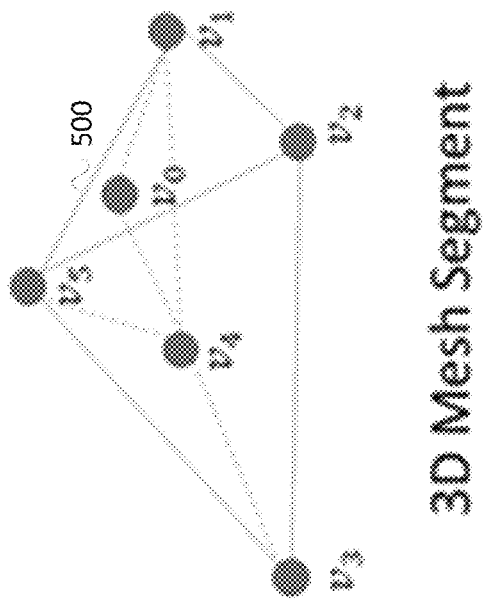

According to some embodiments, a 3D mesh segment may also be mapped to multiple separate 2D charts. When the 3D mesh segment is mapped to separate 2D charts, a vertex in the 3D mesh segment may correspond to multiple vertices in 2D UV atlas. As illustrated in FIG. 5, a 3D mesh segment 500, which may correspond to the 3D mesh segment 400, may be mapped to two 2D charts (502A, 502B), instead of a single chart, in the 2D UV atlas. As illustrated in FIG. 5, 3D vertices $v_1$ and $v_4$ have two 2D correspondences vertices $v_1'$ and $v_4'$ respectively.

Figure 6:
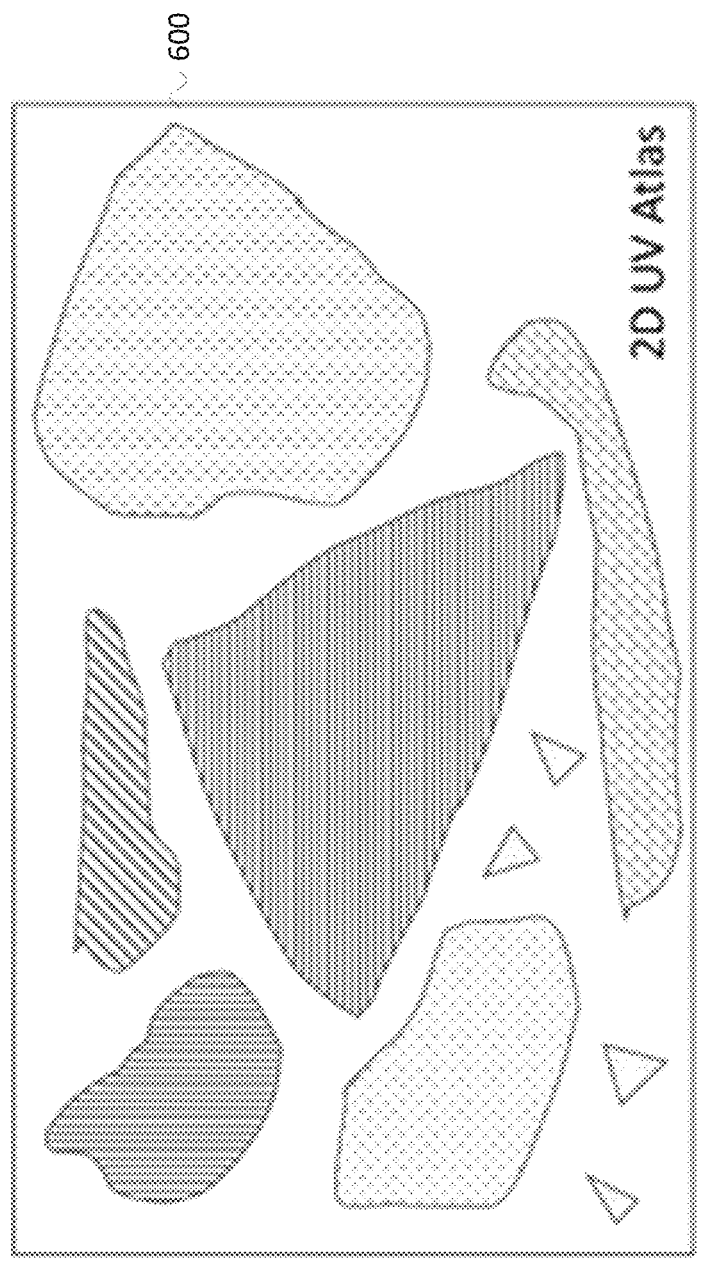
FIG. 6 illustrates an example 2D UV atlas with multiple charts, in accordance with embodiments of the present disclosure.

FIG. 6 illustrates an example of a general 2D UV atlas 600 of a 3D mesh that includes multiple charts, where each chart may contain multiple (e.g., more than or equal to 3) vertices associated with their 3D geometry, attribute, and connectivity information.

Figure 7:
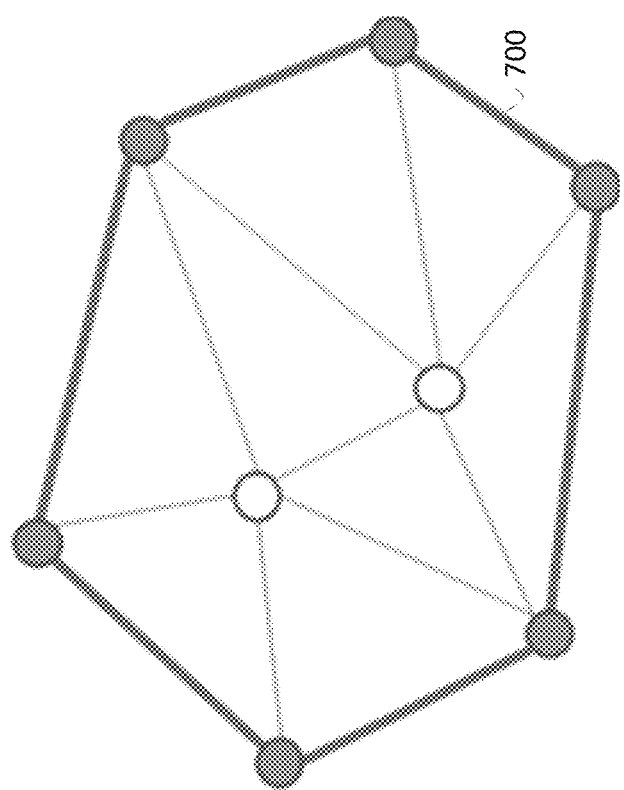
FIG. 7 illustrates an example of boundary vertices in a 2D patch, in accordance with embodiments of the present disclosure.

Boundary vertices may be defined in the 2D UV space. As shown in FIG. 7, the filled vertices are boundary vertices since they are on the boundary edges of a connected component (a patch/chart). A boundary edge may be determined by checking if the edge only appears in one triangle. The geometry information (e.g., 3D xyz coordinates) and 2D UV coordinates may be signaled in a bitstream.

In one or more examples, when a boundary vertex in a 3D mesh corresponds to multiple vertices in a 2D UV atlas, as shown in FIG. 5, the mapping from 3D XYZ coordinates to 2D UV coordinates may be one-to-multiple. Therefore, a UV-to-XYZ (e.g., referred to as UV2XYZ) index may be signaled to indicate the mapping function. UV2XYZ may be a 1D-array of indices that correspond to mapping each 2D UV vertex to a 3D XYZ vertex.

A dynamic mesh sequence may require a large amount of data since the mesh sequence may consist of a significant amount of information changing over time. In particular, the boundary information represents a significant part of the entire mesh. Therefore, efficient compression technologies are needed to efficiently compress the boundary information.

The embodiments of the present disclosure may be used separately or combined in any order. Furthermore, each of the methods (or embodiments), encoder, and decoder may be implemented by processing circuitry (e.g., one or more processors or one or more integrated circuits). In one example, the one or more processors execute a program that is stored in a non-transitory computer-readable medium.

According to one or more embodiments, a number of methods are proposed for coding of a boundary's UV2XYZ (UV-to-XYZ) index array in mesh compression. The methods may be applied individually or by any form of combinations. The methods may be applied to static meshes, where there is only one frame of the mesh, or the mesh content does not change over time.

In one or more examples, the total number of boundary vertices is N, and the number of boundary vertices that have unique xyz coordinates is M (M≤N). UV2XYZ may be a 1D array with the length of N, where each element in the array may indicate an index to a unique XYZ coordinate. For example, UV2XYZ [i]={0,1, ..., M−1}, for i=0,1, ..., N−1.

In one or more examples, the UV2XYZ may be separated into segments where each segment contains the UV2XYZ indices of a chart. According to some embodiments, there are multiple ways to code the array of UV2XYZ in a lossless way.

According to one or more embodiments, due to the nature of vertex storage, when assigning neighboring vertices' indices into the UV2XYZ array, the neighboring UV2XYZ values may have an index difference by 1. For example, for a certain range, there may be monotonical increase or decrease trends. Therefore, the UV2XYZ array may be represented by the following form as a general manner: (a, a+1, a+2, ..., a+$n_a$) (b, b−1, b−2, ..., b−$n_b$) (c, c+1, c+2, ..., c+$n_c$), ... in which it can be separated into several sub-sequences. Each sequence may include continuous indices with the step of +1 or −1.

Therefore, in one or more examples, the UV2XYZ array may be represented and coded as a tuple of run-length-direction:

(a,$n_{a,1}$),(b,$n_b$,−1),(c,$n_{c,1}$), ...

In one or more examples, a UV2XYZ array may be specified as follows:

{100,101,102, 99, 98, 97, 96, 103, 104}

In the above example, this array may be equivalently written in a tuple format as (100, 2, 1), (99, 3,−1), (103, 1, 1). For example, the array in tuple format may be specified as follows:

{100, 2, 1, 99, 3,−1, 103, 1, 1}

According to some embodiments, the tuple of (RUN, LEN, DIR) may include the following parameters: (1) RUN may be a starting index in a run, (2) LEN may be a length of the run minus 1, and (3) DIR is the direction of the run (1 for increasing, −1 for decreasing). A run may indicate a set of one or more consecutive integers that are either increasing or decreasing.

According to some embodiments, the tuple may be coded in different ways. In one more examples, the RUN parameter may be coded by fixed-length coding, where a bit length of a codeword is determined by the number of unique XYZ boundary vertices M (e.g., [$\log_2$ M]). In one or more examples, the LEN parameter may be coded by fixed-length coding, where a bit length of a codeword may be determined by the number of UV boundary vertices in a current chart. For example, the bit length may be determined as [$\log_2 N_j$], where $N_j$ is the number of UV boundary vertices in the $j^{th}$ chart. The value of $N_j$ may also be coded in the bitstream.

In one or more examples, the parameter LEN may be coded by fixed-length coding, where a bit length of the codeword may be determined by a remaining number of UV boundary vertices in the current chart. For example, the bit length may be determined as $$\left\lceil \log_2\left(N_j - \sum\nolimits_{k=0}^{i-1} n_k\right)\right\rceil,$$

where $n_k$ is the LEN of the $k^{th}$ run-length-direction tuple in the $j^{th}$ chart, and the index i is the index of the current coded tuple. In one or more examples, the parameter DIR may be coded by 1-bit bypass coding. In one or more examples, the parameter DIR may be coded by arithmetic coding with contexts.

According to some embodiments, the parameter LEN may be coded by variable length coding, such as by truncated binary coding. In one or more examples, a bit length of a codeword in variable length coding may be determined by the number of UV boundary vertices in a current chart. For example, the bit length may be determined as $\lceil \log_2 N_j \rceil$, where $N_j$ is the number of UV boundary vertices in the $j^{th}$ chart. In one or more examples, $N_j$ may also be coded in the bitstream.

In one or more examples, the parameter LEN may be coded by variable length coding, where a bit length of a codeword may be determined by a remaining number of UV boundary vertices in a current chart. For example, the bit length may be determined as $$\left\lceil \log_2\left(N_j - \sum\nolimits_{k=0}^{i-1} n_k\right)\right\rceil,$$

where $n_k$ is the LEN of the $k^{th}$ run-length-direction tuple in the $j^{th}$ chart, and the index i is the index of the current coded tuple.

In one or more embodiments, a parameter LEN may be coded using a previous length of run as predictor, and the residue may be entropy coded. In one or more embodiments a sign of the residue may be coded using a 1-bit flag. The absolute value of the residue may be coded using Exponential-Golomb coding.

According to one or more embodiments, for a tuple of (RUN, LEN, DIR), one or more binarized codewords may be context coded, while one or more other binarized codewords may be by-pass coded without using any contexts.

In one or more examples, to further save the bits, the encoder may reorder the boundary vertices (e.g., by rotating the UV2XYZ indices) in a chart such that the first run-length-direction tuple in the chart is the longest (e.g., $n_0 \geq n_i$, for i=1, 2, . . . ). The boundary UV and boundary XYZ may be reordered according to the new UV2XYZ indices in this case.

Figure 8:
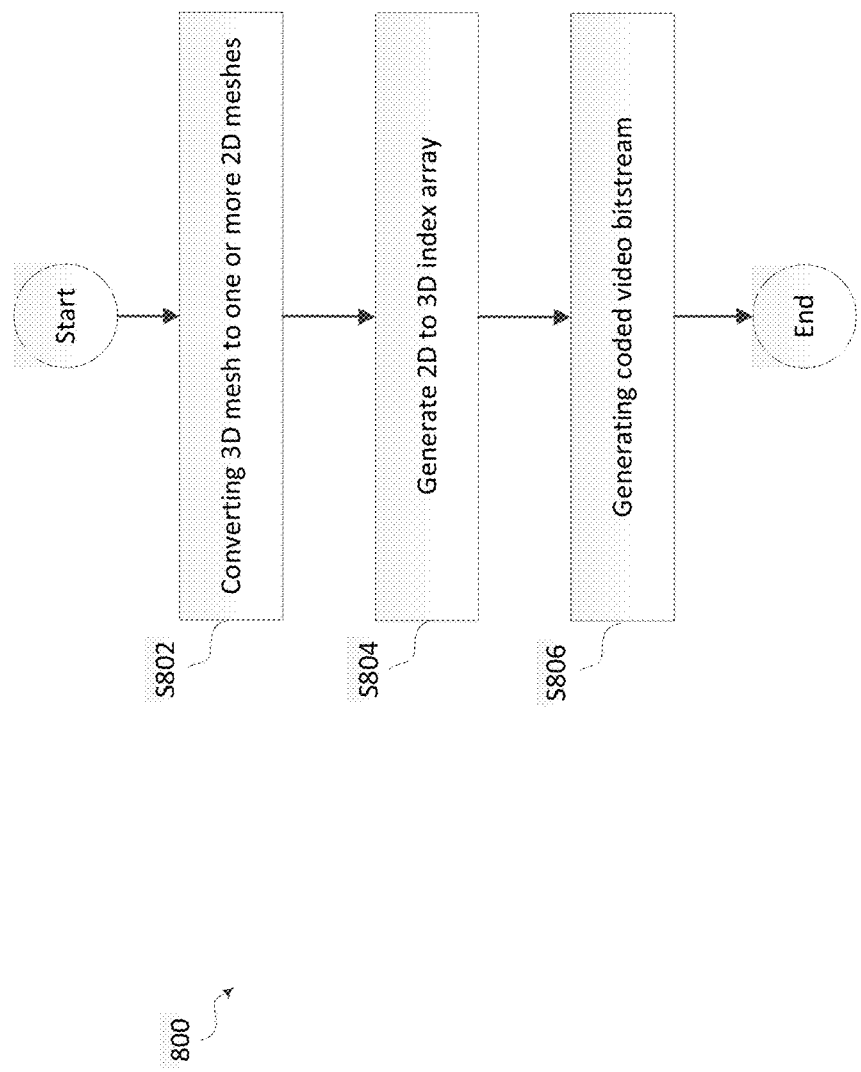
FIG. 8 illustrates an example flowchart for encoding a video bitstream, in accordance with embodiments of the present disclosure.

FIG. 8 illustrates a process 800 for coding a 3D mesh and generating a video bitstream, according to one or more embodiments. The process 800 may be performed by the encoder 301. The process may start at operation S802 where a 3D mesh is converted to one or more 2D meshes. For example, as illustrated in FIG. 5, the 3D mesh 500 is converted to 2D meshes 502A and 502B via UV parameterization.

The process proceeds to operation S804 where a 2D to 3D index array is generated. The 2D to 3D index array may be the UV2XYZ array that maps each vertex in the one or more 2D meshes to a vertex in the 3D mesh. For example, the 2D to 3D index array may map each 2D coordinate in the one or more 2D meshes to a unique XYZ coordinate in the 3D mesh. The 2D to 3D index may be formatted in accordance with the 3D tuple format discussed above.

The process proceeds to operation S806 where a coded video bitstream is generated. The coded video bitstream may include the one or more 2D meshes generated in operation S802 and the 2D to 3D index.

Figure 9:
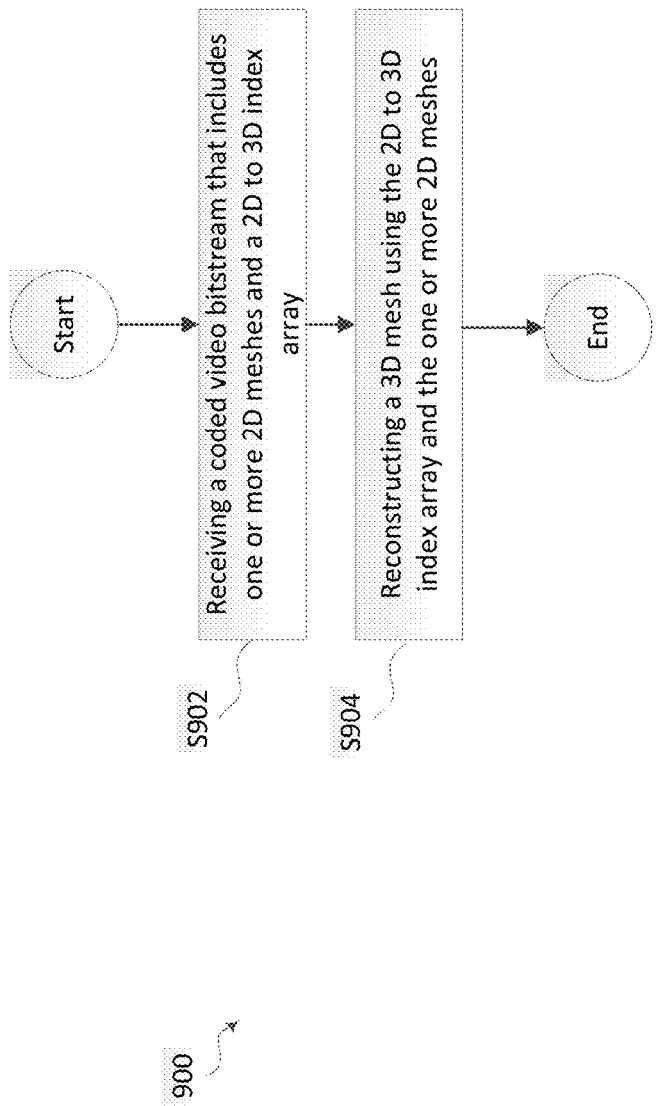
FIG. 9 illustrates an example flowchart for decoding a coded video bitstream, in accordance with embodiments of the present disclosure.

FIG. 9 illustrates a process 900 for decoding a coded video bitstream, according to one or more embodiments. The process 900 may be performed by the decoder 351. The process may start at operation S900 where a coded video bitstream is received. The coded video bitstream may include one or more 2D meshes that correspond to a 3D mesh. The coded video bitstream may further include the 2D to 3D index array such as the UV2XYZ array. The process proceeds to operation S904 where the 3D mesh is reconstructed using the 2D to 3D index array and the one or more 2D meshes. For example, referring to FIG. 5, the 3D mesh segment may be reconstructed using the 2D mesh segments 502A and 502B and the 2D to 3D index array.

The techniques, described above, may be implemented as computer software using computer-readable instructions and physically stored in one or more computer-readable media. For example, FIG. 10 shows a computer system 1000 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 10:
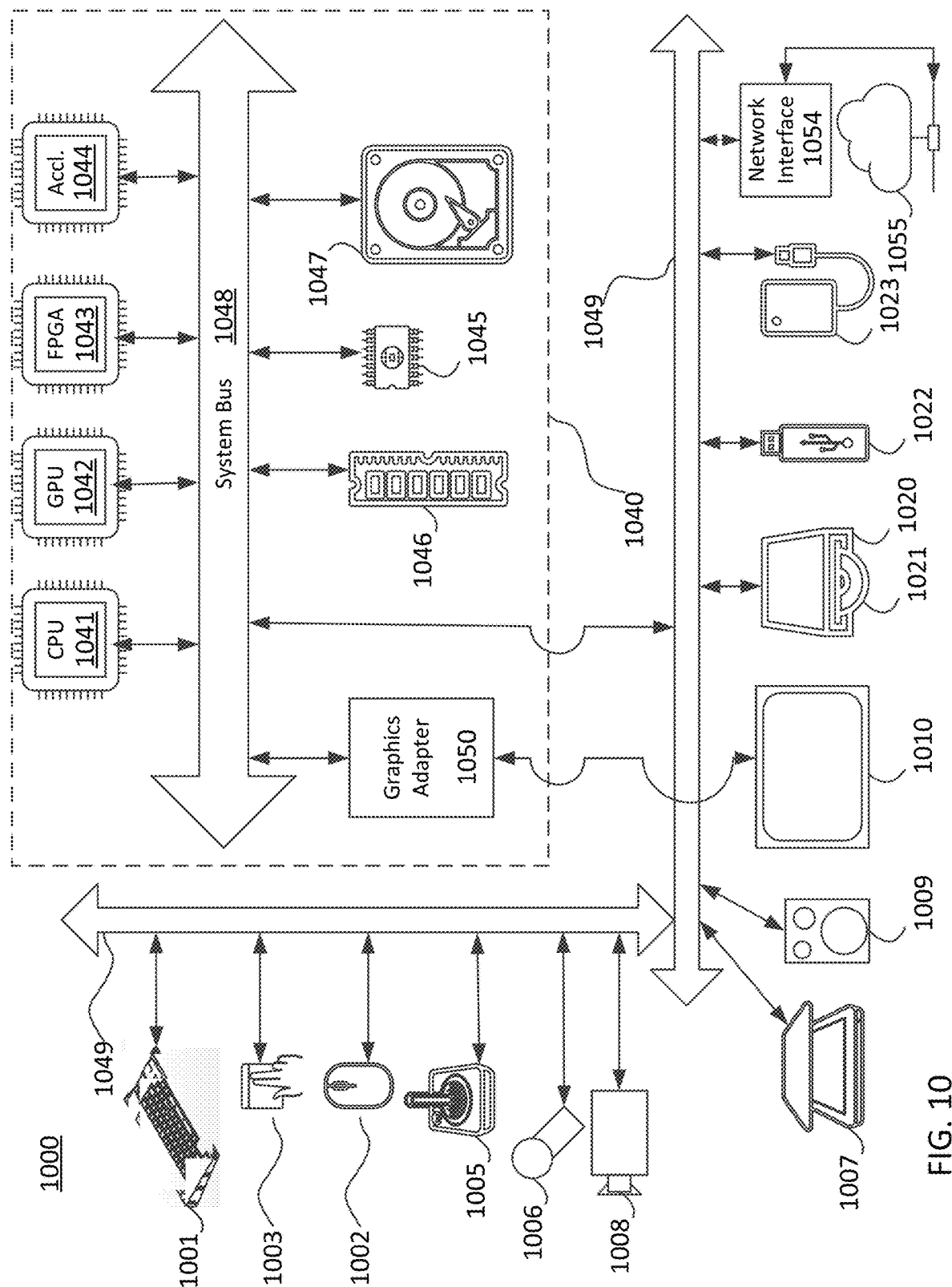
FIG. 10 is a diagram of a computer system suitable for implementing the embodiments of the present disclosure.

The components shown in FIG. 10 for computer system 1000 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1000.

Computer system 1000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1001, mouse 1002, trackpad 1003, touch screen 1010, data-glove, joystick 1005, microphone 1006, scanner 1007, camera 1008.

Computer system 1000 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1010, data glove, or joystick 1005, but there may also be tactile feedback devices that do not serve as input devices). For example, such devices may be audio output devices (such as: speakers 1009, headphones (not depicted)), visual output devices (such as screens 1010 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1000 may also include human accessible storage devices and their associated media such as optical media including CD/DVD ROM/RW 1020 with CD/DVD or the like media 1021, thumb-drive 1022, removable hard drive or solid state drive 1023, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1000 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1049 (such as, for example USB ports of the computer system 1000; others are commonly integrated into the core of the computer system 1000 by attachment to a system bus as described below (for example Ethernet interface into a PC computer system or cellular network interface into a smartphone computer system). Using any of these networks, computer system 1000 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 1055. Certain protocols and protocol stacks may be used on each of those networks and network interfaces as described above.

Aforementioned human interface devices, human-accessible storage devices, and network interfaces 1054 may be attached to a core 1040 of the computer system 1000.

The core 1040 may include one or more Central Processing Units (CPU) 1041, Graphics Processing Units (GPU) 1042, specialized programmable processing units in the form of Field Programmable Gate Areas (FPGA) 1043, hardware accelerators for certain tasks 1044, and so forth. These devices, along with Read-only memory (ROM) 1045, Random-access memory 1046, internal mass storage such as internal non-user accessible hard drives, SSDs, and the like 1047, may be connected through a system bus 1048. In some computer systems, the system bus 1048 may be accessible in the form of one or more physical plugs to enable extensions by additional CPUs, GPU, and the like. The peripheral devices may be attached either directly to the core's system bus 1048, or through a peripheral bus 1049. Architectures for a peripheral bus include PCI, USB, and the like. A graphics adapter 1050 may be included in the core 1040.

CPUs 1041, GPUs 1042, FPGAs 1043, and accelerators 1044 may execute certain instructions that, in combination, may make up the aforementioned computer code. That computer code may be stored in ROM 1045 or RAM 1046. Transitional data may be also be stored in RAM 1046, whereas permanent data may be stored for example, in the internal mass storage 1047. Fast storage and retrieve to any of the memory devices may be enabled through the use of cache memory, that may be closely associated with one or more CPU 1041, GPU 1042, mass storage 1047, ROM 1045, RAM 1046, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 1000, and specifically the core 1040 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 1040 that are of non-transitory nature, such as core-internal mass storage 1047 or ROM 1045. The software implementing various embodiments of the present disclosure may be stored in such devices and executed by core 1040. A computer-readable medium may include one or more memory devices or chips, according to particular needs. The software may cause the core 1040 and specifically the processors therein (including CPU, GPU, FPGA, and the like) to execute particular processes or particular parts of particular processes described herein, including defining data structures stored in RAM 1046 and modifying such data structures according to the processes defined by the software. In addition or as an alternative, the computer system may provide functionality as a result of logic hardwired or otherwise embodied in a circuit (for example: accelerator 1044), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof. The above disclosure also encompasses the embodiments listed below:

(1) A method performed by at least one processor in a decoder, the method comprising: receiving a coded video bitstream that includes (i) one or more two dimensional (2D) meshes corresponding to a three dimensional (3D) mesh and (ii) a 2D to 3D index array that maps each vertex in the one or more 2D meshes to a respective vertex in the 3D mesh; and reconstructing the 3D mesh using the 2D to 3D index array to map each vertex in the one or more 2D meshes to the respective vertex in the 3D mesh, in which the 2D to 3D index array is encoded in a tuple format in which each tuple in the 2D to 3D index array includes a first parameter that specifies a starting index of a run of consecutive integers, a second parameter that specifies a length of the run, and a third parameter that specifies a direction of the run.

(2) The method according to feature (1), in which the first parameter that specifies the starting index of the run is coded by fixed-length coding in which a bit length of a codeword in the fixed-length coding is based on a number of unique 3D boundary vertices in the 3D mesh.

(3) The method according to feature (1) or (2), in which the second parameter that specifies the length of the run is coded by fixed-length coding.

(4) The method according to feature (3), in which a bit length of a codeword in the fixed-length coding is based on a number of 2D boundary vertices in the one or more 2D meshes.

(5) The method according to feature (4), in which the number of 2D boundary vertices is signaled in the coded video bitstream.

(6) The method according to feature (3), in which a bit length of a codeword in the fixed-length coding is based on a remaining number of 2D boundary vertices in a current 2D mesh of the one or more 2D meshes that have yet to be added to the 2D to 3D index array.

(7) The method according to features (1)-(6), in which the third parameter that specifies the direction of the run is coded by one of a 1-bit bypass coding or an arithmetic coding with contexts.

(8) The method according to any one of features (1)-(7), in which the second parameter that specifies the length of the run is coded by variable-length coding.

(9) The method according to feature (8), in which a bit length of a codeword in the variable-length coding is based on a number of 2D boundary vertices in a current 2D mesh of the one or more 2D meshes.

(10) The method according to feature (8), in which a bit length of a codeword in the variable-length coding is based on a remaining number of 2D boundary vertices in a current 2D mesh of the one or more 2D meshes that have yet to be added to the 2D to 3D index array.

(11) The method according to any one of features (1)-(10), in which the second parameter that specifies the length of the run is predicted based on a length of a prior run.

(12) The method according to any one of features (1)-(11), in which the 2D to 3D index array is ordered such that a tuple among a plurality of tuples having a longest run length is at a front of the 2D to 3D index array.

(13) A decoder comprising: at least one memory configured to store program code; and at least one processor configured to read the program code and operate as instructed by the program code, the program code including: receiving code configured to cause the at least one processor to receive a coded video bitstream that includes (i) one or more two dimensional (2D) meshes corresponding to a three dimensional (3D) mesh and (ii) a 2D to 3D index array that maps each vertex in the one or more 2D meshes to a respective vertex in the 3D mesh; and reconstructing code configured to cause the at least one processor to reconstruct the 3D mesh using the 2D to 3D index array to map each vertex in the one or more 2D meshes to the respective vertex in the 3D mesh, in which, the 2D to 3D index array is encoded in a tuple format in which each tuple in the 2D to 3D index array includes a first parameter that specifies a starting index of a run of consecutive integers, a second parameter that specifies a length of the run, and a third parameter that specifies a direction of the run.

(14) The decoder according to feature (13), in which the first parameter that specifies the starting index of the run is coded by fixed-length coding in which a bit length of a codeword in the fixed-length coding is based on a number of unique 3D boundary vertices in the 3D mesh.

(15) The decoder according to feature (13) or (14), in which the second parameter that specifies the length of the run is coded by fixed-length coding.

(16) The decoder according to any one of features (13)-(15), in which a bit length of a codeword in the fixed-length coding is based on a number of 2D boundary vertices in the one or more 2D meshes.

(17) The decoder according to feature (16), in which the number of 2D boundary vertices is signaled in the coded video bitstream.

(18) The decoder according to feature (15), in which a bit length of a codeword in the fixed-length coding is based on a remaining number of 2D boundary vertices in a current 2D mesh of the one or more 2D meshes that have yet to be added to the 2D to 3D index array.

(19) The decoder according to any one of features (13)-(18), in which the third parameter that specifies the direction of the run is coded by one of a 1-bit bypass coding or an arithmetic coding with contexts.

(20) A non-transitory computer readable medium having instructions stored therein, which when executed by a processor in a decoder cause the processor to execute: receiving a coded video bitstream that includes (i) one or more two dimensional (2D) meshes corresponding to a three dimensional (3D) mesh and (ii) a 2D to 3D index array that maps each vertex in the one or more 2D meshes to a respective vertex in the 3D mesh; and reconstructing the 3D mesh using the 2D to 3D index array to map each vertex in the one or more 2D meshes to the 3D mesh, in which, the 2D to 3D index array is encoded in a tuple format in which each tuple in the 2D to 3D index array includes a first parameter that specifies a starting index of a run of consecutive integers, a second parameter that specifies a length of the run, and a third parameter that specifies a direction of the run.

What is claimed is:

1. A method performed by at least one processor in a decoder, the method comprising:

receiving a coded video bitstream that includes (i) one or more two dimensional (2D) meshes corresponding to a three dimensional (3D) mesh of a volumetric object and (ii) a 2D to 3D index array that maps each vertex in the one or more 2D meshes to a respective vertex in the 3D mesh; and reconstructing the 3D mesh of the volumetric object using the 2D to 3D index array to map each vertex in the one or more 2D meshes and corresponding 2D mesh segments to the respective vertex in the 3D mesh to reconstruct the volumetric object, wherein the 2D to 3D index array is encoded in a tuple format in which each tuple in the 2D to 3D index array includes a first parameter that specifies a starting index of a run of consecutive integers, a second parameter that specifies a length of the run, and a third parameter that specifies a direction of the run.

2. The method according to claim 1, wherein the first parameter that specifies the starting index of the run is coded by fixed-length coding in which a bit length of a codeword in the fixed-length coding is based on a number of unique 3D boundary vertices in the 3D mesh.

3. The method according to claim 1, wherein the second parameter that specifies the length of the run is coded by fixed-length coding.

4. The method according to claim 3, wherein a bit length of a codeword in the fixed-length coding is based on a number of 2D boundary vertices in the one or more 2D meshes.

5. The method according to claim 4, wherein the number of 2D boundary vertices is signaled in the coded video bitstream.

6. The method according to claim 3, wherein a bit length of a codeword in the fixed-length coding is based on a remaining number of 2D boundary vertices in a current 2D mesh of the one or more 2D meshes that have yet to be added to the 2D to 3D index array.

7. The method according to claim 1, wherein the third parameter that specifies the direction of the run is coded by one of a 1-bit bypass coding or an arithmetic coding with contexts.

8. The method according to claim 1, wherein the second parameter that specifies the length of the run is coded by variable-length coding.

9. The method according to claim 8, wherein a bit length of a codeword in the variable-length coding is based on a number of 2D boundary vertices in a current 2D mesh of the one or more 2D meshes.

10. The method according to claim 8, wherein a bit length of a codeword in the variable-length coding is based on a remaining number of 2D boundary vertices in a current 2D mesh of the one or more 2D meshes that have yet to be added to the 2D to 3D index array.

11. The method according to claim 1, wherein the second parameter that specifies the length of the run is predicted based on a length of a prior run.

12. The method according to claim 1, wherein the 2D to 3D index array is ordered such that a tuple among a plurality of tuples having a longest run length is at a front of the 2D to 3D index array.

13. A decoder comprising:
at least one memory configured to store program code; and
at least one processor configured to read the program code and operate as instructed by the program code, the program code including:
receiving code configured to cause the at least one processor to receive a coded video bitstream that includes (i) one or more two dimensional (2D) meshes corresponding to a three dimensional (3D) mesh of a volumetric object and (ii) a 2D to 3D index array that maps each vertex in the one or more 2D meshes to a respective vertex in the 3D mesh; and
reconstructing code configured to cause the at least one processor to reconstruct the 3D mesh of the volumetric object using the 2D to 3D index array to map each vertex in the one or more 2D meshes and corresponding 2D mesh segments to the respective vertex in the 3D mesh to reconstruct the volumetric object,
wherein, the 2D to 3D index array is encoded in a tuple format in which each tuple in the 2D to 3D index array includes a first parameter that specifies a starting index of a run of consecutive integers, a second parameter that specifies a length of the run, and a third parameter that specifies a direction of the run.

14. The decoder according to claim 13, wherein the first parameter that specifies the starting index of the run is coded by fixed-length coding in which a bit length of a codeword in the fixed-length coding is based on a number of unique 3D boundary vertices in the 3D mesh.

15. The decoder according to claim 13, wherein the second parameter that specifies the length of the run is coded by fixed-length coding.

16. The decoder according to claim 15, wherein a bit length of a codeword in the fixed-length coding is based on a remaining number of 2D boundary vertices in a current 2D mesh of the one or more 2D meshes that have yet to be added to the 2D to 3D index array.

17. The decoder according to claim 13, wherein a bit length of a codeword in the fixed-length coding is based on a number of 2D boundary vertices in the one or more 2D meshes.

18. The decoder according to claim 17, wherein the number of 2D boundary vertices is signaled in the coded video bitstream.

19. The decoder according to claim 13, wherein the third parameter that specifies the direction of the run is coded by one of a 1-bit bypass coding or an arithmetic coding with contexts.

20. A non-transitory computer readable medium having instructions stored therein, which when executed by a processor in a decoder cause the processor to execute:
receiving a coded video bitstream that includes (i) one or more two dimensional (2D) meshes corresponding to a three dimensional (3D) mesh of a volumetric object and (ii) a 2D to 3D index array that maps each vertex in the one or more 2D meshes to a respective vertex in the 3D mesh; and
reconstructing the 3D mesh of the volumetric object using the 2D to 3D index array to map each vertex in the one or more 2D meshes and corresponding 2D mesh segments to the respective vertex in the 3D mesh to reconstruct the volumetric object,
wherein, the 2D to 3D index array is encoded in a tuple format in which each tuple in the 2D to 3D index array includes a first parameter that specifies a starting index of a run of consecutive integers, a second parameter that specifies a length of the run, and a third parameter that specifies a direction of the run.

* * * * *